March 28, 1967 R. L. NELSON 3,311,753

COMPARISON CIRCUIT

Filed Jan. 16, 1964

RAYMOND L. NELSON
INVENTOR.

BY R. Frank Smith
David P. Ogden
ATTORNEYS 3,311,753
COMPARISON CIRCUIT

Raymond L. Nelson, Rochester, N.Y., assignor to Eastman Kodak Company, Rochester, N.Y., a corporation of New Jersey Filed Jan. 16, 1964, Ser. No. 338,139
10 Claims. (Cl. 307—88.5)

The present invention relates to a comparison circuit, or more particularly to a multiple signal comparison circuit.

Various comparison circuits are known for developing signals indicative of the coincidence of a set of input signals or pulses compared to a coded set of pulses or information included in, or applied to, the comparison circuit. Many of these comparison or coincidence circuits utilize a plurality such as six or eight triode vacuum tubes or transistors to compare a few, such as two or three, input signals. Often the signals are combined in a way which results in a total signal pattern substantially greater than one of the signals. As may be imagined, this type of comparison circuit or signal coincidence circuit is relatively complex, expensive and difficult to properly encode or to maintain in reliable operating condition.

Therefore, an object of the present invention is to provide an improved, simple and reliable comparison circuit.

In accordance with one embodiment of the present invention, a plurality such as four binary signals are coupled to the input of the comparison circuit. These signals are selectively applied to transistors of the circuit so that if all signals are in accordance with the coding requested, an output signal is obtained. If one of these signals is relatively negative when a relatively positive signal is called for by the position of a selector switch, one of the transistors is energized to cut off the output signal. If a signal is relatively positive when called for as negative, the other transistor is energized to cut off the output signal. Thus, an output signal is obtained only when all of the signals are coincident with the encoding of the selector switch.

The subject matter which is regarded as my invention in particularly pointed out and distinctly claimed in the concluding portion of the specification. The invention, however, as to its organization and operation together with further objects and advantages thereof, will best be understood by reference to the following description taken in connection with the accompanying drawing in which:

Figure 1:
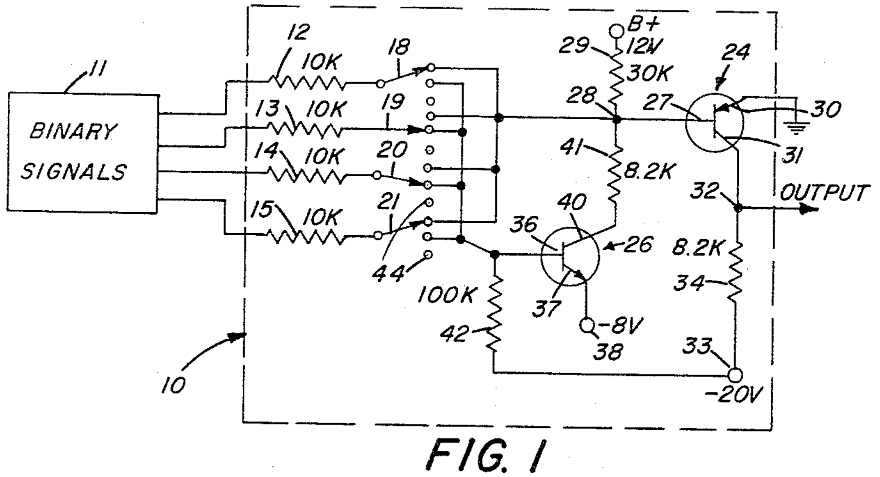
FIG. 1 is a schematic diagram of one embodiment of the electronic elements usable to practice my invention.

Referring now to the drawing, wherein like numbers refer to similar parts, in FIG. 1 I have shown a signal comparison circuit 10 coupled to receive a plurality of signals from a binary signal source 11. The particular embodiment disclosed is arranged to compare input signals of eight volt differential and the source 11 is adapted to provide signals of either zero volts, shown as a ground potential, or −8 volts selectively. Obviously, other signal levels could be utilized. However, the specifically named voltages are easy to work with as will become apparent from the following discussion.

Figures 2, 3:
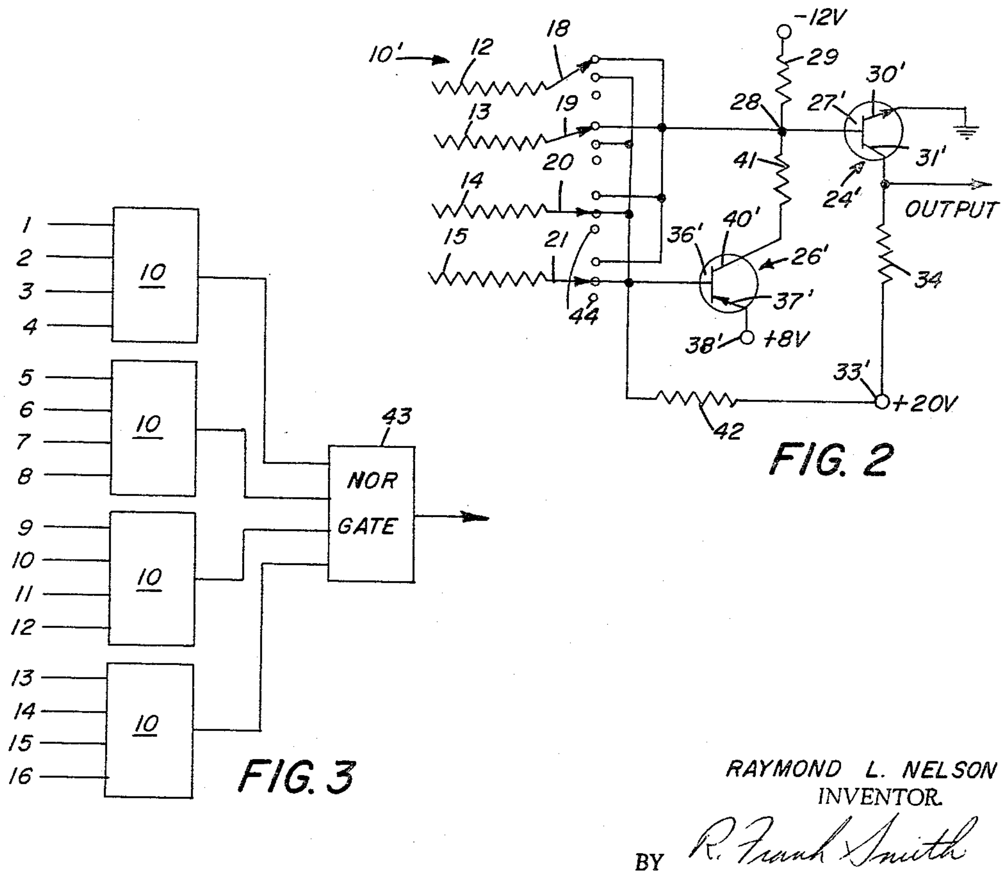
FIG. 2 is a schematic diagram of another embodiment.
FIG. 3 is a block diagram illustrating one use of my invention.

The input signals are applied through similar resistors 12, 13, 14, and 15 to similar selector switches 18, 19, 20 and 21. The switches are arranged to couple the binary signals to transistors 24 and 26 respectively in accordance with the signal information expected from the four signal paths passing through the resistors 12–15 inclusive. Although several more binary signals could be compared by the use of more switches such as 18–21 being positioned to establish a standard for comparison, the following discussion is directed toward the switches 18–21 being set to receive a signal 1001 (FIG. 1) or a signal 1100 (FIG. 2). Thus the signals being searched for as coming through the resistors at ground potential are both coupled to a base electrode 27 of the transistor 24. A junction 28 at the base 27 is also coupled by a resistor 29 to a B+ voltage of 12 volts. An emitter electrode 30 of the transistor 24 is coupled to ground and a collector electrode 31 is coupled to an output terminal 32. At such times only zero potential voltages are applied to the base 27, and the transistor 24 remains in the "off" condition whereby the signal at the output terminal 32 remains at a negative level approaching the −20 volts from a source 33 which is coupled thereto by voltage dropping resistor 34. Obviously any negative signal level input will turn the transistor 24 "on."

Similarly, the signals coming through the resistors 13 and 14 are both coupled by the switch means 19 and 20 to a base electrode 36 of the transistor 26. If these signals are −8 volts, the transistor 26 will also remain off. The emitter electrode 37 of this transistor is coupled to a negative −8 voltage source 38 and the collector electrode 40 is coupled by a resistor 41 to the junction 28 coupled to the base 27 of the transistor 24. So long as signals of −8 volts are applied to the base 36, the transistor 24 also remains cut off because of a potential relationship thus established.

Should a negative voltage be transmitted to the base 27 of the transistor 24, this transistor will become conductive indicating a lack of comparison between the setting of the switches 18–21 and the incoming binary signals from the source 11. When the transistor 24 becomes conductive it grounds the output terminal 32 therethrough. Similarly, should a ground potential signal be applied to base 36, the transistor 26 will become conductive to couple the collector electrode 40 to the negative source 38. Such conductance will reduce the potential at the junction 28 and the potential at the base 27 substantially below the ground potential. This will do approximately the same as a negative signal being applied across the switches 18 or 21 (FIG. 1) and will make the transistor 24 conductive to similarly ground the output terminal 32. On the other hand, should all of the signals from the binary signal source 11 match the settings of the switches 18–21 inclusive, to which they are being compared, the transistors 26 and 24 will remain nonconductive and the output voltage at the terminal 32 will so indicate by remaining at 8 volts negative. It is apparent from the circuitry shown that the negative voltage source 33 is coupled to the transistor 26 by means of a 100K resistor 42. Obviously, if no signals from the binary source 11 are coupled to this transistor 26, this high impedance path (42) will maintain a proper bias to prevent its conducting.

The arrangement of a circuit 10′ shown in FIG. 2, is what might be termed a mirror image of that in FIG. 1. That is, the voltage potentials have been reversed, the PNP transistor 24 has been replaced by a NPN transistor 24′ and the NPN transistor 26 has been replaced by a PNP transistor 26′. Otherwise, the components correspond as the numbers indicate. However, the input and output signals now have magnitudes of zero and +8 volts compared to the ground potential of the circuit 10′.

In FIG. 3 I have shown a network including four ganged comparison circuits for searching a digital encoding comprising as many as sixteen digits with the outputs thereof being supplied to a Nor circuit 43. Often such a system will be employed to search a record having less than 16 encoded digits, whereby a standby or "don't care" position is provided in the switches 18, 19, 20 and 21 as indicated at 44 (FIGS. 1 and 2).

While I have shown and described particular embodiments of my invention, other modifications will occur to those skilled in the art. For instance, the potential of ground of the circuits 10 and 10' need not necessarily be the same as ground potentials of other circuits coupled thereto. Such modifications as fall within the proper scope of my invention are intended to be covered by the appended claims.

I claim:

1. A multiple signal comparison circuit comprising:

a plurality of similar impedance means each selectively receptive of a first or a second input signal at different voltage magnitudes with the first input signal being at the ground potential of the comparison circuit;

first transistor switch means having an emitter electrode clamped to ground and a base and a collector electrode;

multiple throw switch means arranged to couple selectively each of said similar impedance means to the base of said first transistor switch means;

an output terminal coupled to the collector electrode of said first transistor means;

a first impedance coupling said output terminal to a first voltage source of the same relative polarity and a greater relative magnitude than the second input signal;

a second impedance coupling the base of said first transistor switch means to a second voltage source of opposite polarity relative to that of the first voltage source whereby said first transistor switch means is normally off;

second transistor switch means having a base and a collector electrode and having its emitter electrode clamped at a voltage equal to the potential of the second input signal, said selector switch means being arranged to couple selectively each of said similar impedance means to the base of said second transistor switch means;

means for coupling the collector electrode of said second transistor switch means to initiate energization of said first transistor switch means when said second transistor switch means is energized; and a third impedance coupling the base of said second transistor switch means to the first voltage source whereby said second transistor switch means is normally off, both of said transistor switch means remaining off until one of said similar impedance means transmits an input signal through said selector switch means at a potential other than the one to which such transistor is clamped to energize such one of them whereupon said first transistor switch means grounds said output terminal.

2. A multiple signal comparison circuit as in claim 1 wherein;

the second input signal is negative;

said first transistor switch means is a PNP type transistor, the second voltage source is positive, and said second transistor switch means is an NPN type.

3. A multiple signal comparison circuit comprising;

a plurality of similar impedance means each selectively receptive of a first or a second input signal at different voltage levels;

a first normally off transistor having a base, an emitter electrode clamped to ground which is established at the voltage level of the first input signal and a collector electrode coupled to an output terminal conditionally maintainable at the voltage level of the second input signal;

a second, normally off transistor having a base, an emitter electrode clamped to the voltage level of the second input signal and a collector electrode coupled to the base of said first transistor; and multiple throw switch means arranged to couple selectively each of said similar impedance means to the bases of said transistors to energize at least one of them at such times as an input signal level does not coincide with the level at which the receptive transistor is clamped, whereby the output terminal is coupled by said first transistor to a voltage level equal to the first input signal, both of said transistors remaining off until one of said similar impedance means transmits a non-coinciding input signal through said switch means to energize one of them whereupon said first transistor is energized.

4. A multiple signal comparison circuit as in claim 3 wherein the second input signal is eight volts negative compared to the first input signal, and an impedance of a magnitude in accordance with the impedance of the circuit of the output signal couples the output terminal to a voltage supply substantially more negative than eight volts negative.

5. A multiple signal comparison circuit comprising;

a plurality of similar impedance means each receptive selectively of a first or a second input signal of different voltage levels;

a first transistor having an emitter electrode clamped to a voltage level equal to the first input signal;

a second transistor having an emitter electrode clamped to a voltage level equal to the second input signal;

electric circuit means coupling base and collector electrodes of both of said transistors to potentials which will inhibit current flow therethrough during steady state conditions;

means coupling the collector of said second transistor to the base of said first transistor so that conductance of said second transistor will energize said first transistor;

a multiple throw switch arranged to couple selectively each of said similar impedance means to the base of one of said transistors whereby an input signal of a potential other than that to which the respective emitter electrodes are clamped will energize the transistor receiving same; and an output terminal coupled to the collector electrode of said first transistor to be maintained at a voltage level equal to the voltage level of the first input signal when said first transistor is conductive and coupled to a voltage source to be of another voltage level when said first transistor is nonconductive.

6. A multiple signal comparison circuit comprising:

a plurality of similar impedance means each receptive selectively of a first or a second input signal at different voltage levels;

a first transistor having an emitter electrode clamped to a voltage level equal to the first input signal;

a second transistor having an emitter electrode clamped to a voltage level equal to the second input signal;

electric circuit means coupling base and collector electrodes of both of said transistors to potentials which will inhibit current flow therethrough, the magnitude of voltage potentials being greater than that necessary to initiate current flow by application of the first input signal to the base of said first transistor or the second input signal to the base of said second transistor but less than that necessary to initial current flow when the input signals are reversed;

means coupling the collector of said second transistor to said first transistor so that substantial conductance of said second transistor will energize said first transistor; and means for selectively coupling said similar impedance means to the bases of said transistors whereby an input signal of a potential other than that to which the respective emitter electrodes are clamped will energize the transistor receiving same.

7. A multiple signal comparison circuit comprising:
four similar impedance means each selectively receptive of a first or a second input signal at different voltage levels;
a first normally off transistor having an emitter electrode clamped to ground which is maintained at the voltage level of the first input signal, a collector electrode coupled to an output terminal conditionally maintainable at the voltage level of the second input signal and a base coupled to a first voltage source of a polarity opposite that of the second input signal;
a second normally off transistor having an emitter electrode clamped to the voltage level of the second input signal, a collector electrode coupled to the base of said first transistor and a base coupled to a voltage source of a polarity opposite that of the first voltage source;
multiple throw switch means arranged to couple selectively each of said similar impedance means to the base of one of said transistors to energize at least one of them at such times as an input signal level does not coincide with the level at which either receptive transistor is clamped, whereby the output terminal is grounded by said first transistor.

8. A multiple signal comparison circuit as in claim 7 wherein said multiple throw switch means is provided with neutral positions so that one or more of the input signals may be of no consequence to the operation of said transistors.

9. A multiple signal comparison circuit for comparing a plurality of signals having voltage potentials at one of two preselected levels, comprising:
a first transistor having its emitter electrode clamped to a potential equal to a first of the input signal voltage levels;
a second transistor having its emitter electrode clamped to a potential equal to the second input voltage level;
electrical circuit means for biasing said transistors to remain off when input signals are applied to their bases at voltage levels equal to that at which each is clamped respectively; and
means for selectively applying the input signals to the bases to obtain conductance thereof when any one input signal is not in accordance with the respective clamping voltage.

10. A multiple signal comparison circuit as in claim 9 wherein an output terminal conditionally maintained at the voltage level of the second input signal is coupled to a collector electrode of said first transistor; and
means coupling said second transistor to energize said first transistor when it is energized whereby any substantial conductance of either of said transistors will clamp said output signal at the first input signal voltage level.

No references cited.

ARTHUR GAUSS, *Primary Examiner.*

J. ZAZWORSKY, *Assistant Examiner.*

UNITED STATES PATENT OFFICE

CERTIFICATE OF CORRECTION

Patent No. 3,311,753 March 28, 1967

Raymond L. Nelson

It is hereby certified that error appears in the above numbered patent requiring correction and that the said Letters Patent should read as corrected below.

Column 4, line 65, for "initial" read -- initiate --.

Signed and sealed this 2nd day of July 1968.

(SEAL)
Attest:

Edward M. Fletcher, Jr.
Attesting Officer

EDWARD J. BRENNER
Commissioner of Patents